(12) United States Patent
Kim

(10) Patent No.: US 6,803,986 B2
(45) Date of Patent: Oct. 12, 2004

(54) METHOD OF FABRICATING A LIQUID CRYSTAL DISPLAY CELL

(75) Inventor: Jong-Sung Kim, Edmonton (CA)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/774,065

(22) Filed: Jan. 31, 2001

(65) Prior Publication Data

US 2002/0018174 A1 Feb. 14, 2002

(30) Foreign Application Priority Data

Feb. 1, 2000 (KR) .......................................... 2000-4912

(51) Int. Cl.$^7$ ..................... G02F 1/1339; G02F 1/1341
(52) U.S. Cl. ........................ 349/190; 349/153; 349/189
(58) Field of Search ................................ 349/153, 189, 349/190, 154, 156

(56) References Cited

U.S. PATENT DOCUMENTS 6,086,443 A * 7/2000 Shin et al. ..................... 445/25
6,104,467 A * 8/2000 Nakahara et al. ........... 349/189

* cited by examiner

*Primary Examiner*—Robert H. Kim
*Assistant Examiner*—Hoan C. Nguyen
(74) *Attorney, Agent, or Firm*—Morgan Lewis & Bockius LLP

(57) ABSTRACT

A method of fabricating a liquid crystal display panel having first and second substrates, the method includes the steps of forming first and second orientation films on the first and second substrates, respectively, forming a seal material at edges of the first substrate, assembling the first and second substrates with each other, performing a first pressurizing and heating process on the first and second substrates to form a first cell gap, injecting a liquid crystal material into the first cell gap, performing second pressurizing and heating process on the first and second substrates to form a second cell gap, and sealing the second cell gap.

10 Claims, 3 Drawing Sheets

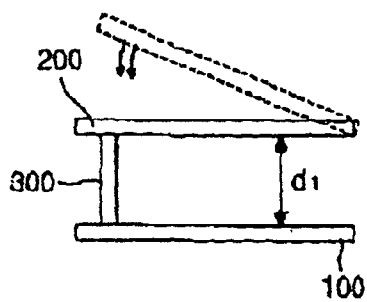
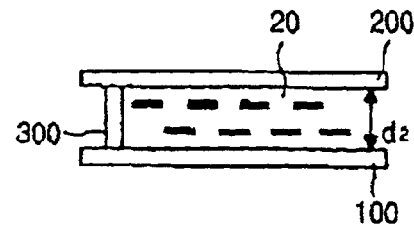
FIG.5A  FIG.5B
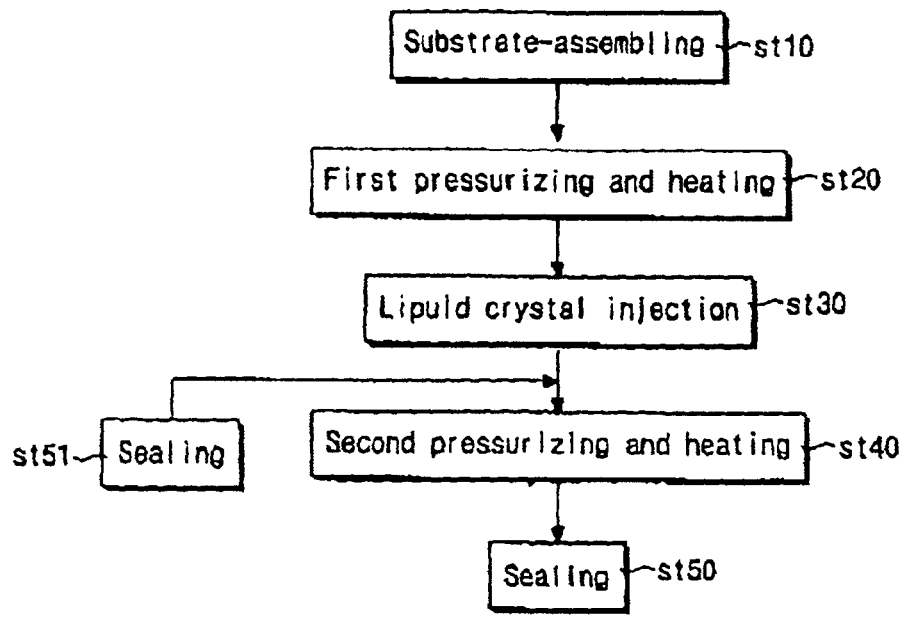
FIG.6

METHOD OF FABRICATING A LIQUID CRYSTAL DISPLAY CELL

This application claims the benefit of Korean Patent Application No. 2000-4912, filed on Feb. 1, 2000, which is hereby incorporated by reference.

BACKGROUND OF THE INVENTION

1. Field of the Invention

The present invention relates to a liquid crystal display (LCD) panel, and more particularly, to a method of fabricating liquid crystal display panel for increasing yield as well as decreasing an injection time of the liquid crystal.

2. Discussion of the Related Art

A typical liquid crystal display (LCD) panel has upper and lower substrates and an interposed liquid crystal layer. More specifically, the upper substrate includes common electrodes, while the lower substrate includes switching elements, such as thin film transistors (TFTs), and pixel electrodes.

As the present invention relates to manufacturing liquid crystal display panel, a brief explanation about the conventional liquid crystal display manufacturing processes will be helpful to fully understand the present invention. Common electrodes and pixel electrodes are formed on upper and lower substrates, respectively. A seal is then formed on the lower substrate. The upper and lower substrates are then bonded together using a sealing material so that the common electrodes of the upper substrate and the pixel electrodes of the lower substrate are facing to each other. Thereafter, liquid crystal panels are completed. A liquid crystal material is injected between the substrates through injection holes. The injection holes are then sealed. Finally, polarizing films are attached to the outer surfaces of the upper and lower substrates.

In operating the liquid crystal display panel, light passing through the liquid crystal display panel is controlled by electric fields. The electric fields are applied through the pixel and common electrodes. By controlling the electric fields, desired characters or images are displayed on the panel.

A fabrication process of the various components of a liquid crystal display, such as the thin film transistors or the color filters, typically requires numerous manufacturing steps. However, the overall fabrication process is relatively straightforward. FIG. 1 illustrates a typical liquid crystal display panel fabrication process. In the initial step (st1) an array of thin film transistors and pixel electrodes are formed on an array or TFT (lower) substrate.

In the next step (st2), an orientation film is formed on the lower substrate. This step includes uniformly depositing a polymer thin film on the lower substrate and uniformly running the polymer thin film with a fabric. The rubbing process includes rubbing the surface of the polymer thin film so as to orient or align the film. A typical orientation film is an organic thin film such as a polyimide thin film.

The third step (st3) produces a seal pattern on the lower substrate. When the upper and lower substrates are attached, the seal patterns form cell gaps that will receive the liquid crystal material. The seal pattern will also prevents the interposed liquid crystal material from leaking out of the completed liquid crystal cell. A thermosetting resin and a screen-print technology are conventionally used to fabricate the seal pattern.

In the fourth step (st4), spacers are sprayed on the lower substrate. The spacers have a predetermined size and act to maintain a precise and uniform space between the upper and lower substrates. Accordingly, the spacers are placed with a uniform density on the lower substrate using either a wet spray method or a dry spray method. In the wet spray method, the spacers are mixed in alcohol and then sprayed. Only the spacers are sprayed in the dry spray method. The dry spray method is classified into a static electric spray method and a non-electric spray method. The static electric spray method uses static electricity while the non-electric spray method uses gas pressure. Since static electricity can be harmful to the liquid crystal, the non-electric spray method is more widely used.

In the next step (st5), the color filter substrate (upper substrate) and the TFT substrate (lower substrate) are aligned and attached to each other. An aligning error margin in this case is less than a few micrometers. If the upper and lower substrates are aligned and attached with an aligning margin larger than the error margin, a display quality is deteriorated due to light leakage during the operation of the liquid crystal display cell.

In the sixth step (st6), the liquid crystal element fabricated in the above five steps is cut into individual liquid crystal cells. Conventionally, a liquid crystal material was injected into the space between the upper and lower substrates before the substrates were cut into individual liquid crystal cells. However, as displays become larger, the liquid crystal cells are usually cut first and then the liquid crystal material is injected. The process of cutting includes the step of scribing by using a diamond pen to form cutting lines on a substrate and the step of breaking that separates the substrate along the scribed lines.

In the seventh step (st7), the liquid crystal material is injected into the individual liquid crystal cells. Since each individual liquid crystal cell has many hundred square centimeters in area while it has only a few micrometers gap between the substrates, a vacuum injection method is effectively and widely used. Generally, injecting the liquid crystal material into the cells takes the longest time among the fabrication processes. Thus, for manufacturing efficiency, it is important to have an optimum condition for the vacuum injection.

FIG. 2 shows a conventional vacuum injection process for injecting a liquid crystal material into a liquid crystal cell. To inject the liquid crystal material, a liquid crystal cell 2 having an injection hole 4 is placed inside a vacuum apparatus 6. The liquid crystal cell 2 is located over a vessel 8 that contains the liquid crystal material 10. During operation, a suction process removes air from the vacuum apparatus 6, thereby forming a high vacuum condition.

In practice, small air bubbles in the liquid crystal material 10 may be gradually added to form larger air bubbles. Such air bubbles however may cause problems. Accordingly, before the injection, the liquid crystal material 10 should be left under a vacuum condition of a few mTorr for a sufficient time so that the air bubbles in the liquid crystal material 10 are removed. Conventionally, both the vessel 8 containing the liquid crystal material 10 and the liquid crystal cell 2 are left under this vacuum condition.

One method of injecting a liquid crystal material into the liquid crystal cell is to dip the liquid crystal cell into the tray containing the liquid crystal material. However, the dipping method waists too much of the liquid crystal material. Another method is touching (slightly dipping) only the injection hole 4 to the liquid crystal material. Referring to FIG. 2, after air in the liquid crystal cell 2 and in the liquid crystal material 10 has been removed, the injection hole 4 is slightly dipped into the vessel 6 containing the liquid crystal material 10. In this process, the liquid crystal material 10 is injected into the liquid crystal cell 2 by capillary forces. A nitrogen gas is then introduced into the vacuum apparatus 6. A difference in pressure between the interior and exterior of the liquid crystal cell 2 forces the liquid crystal material 10 into the liquid crystal cell 2.

FIG. 3 is a graph illustrating a pressure in the vacuum apparatus 6 with respect to time. During the period "A", a vacuum condition is formed. At the end of the period "A", the injection hole 4 is dipped into the vessel 8 containing the liquid crystal material 10. During the period "B", the liquid crystal material 10 is infected by pressure into the liquid crystal cell. After the injection of the liquid crystal material is complete, the injection hole 4 is sealed with an epoxy-based sealant that is applied by a dispenser. However, for large size panels (such as panels greater than 20-inch panels), a liquid crystal injection using the above-described injection method takes too much time. Moreover, it is difficult to maintain a cell gap during the injection.

FIG. 4 is a schematic cross-sectional view of a typical LCD panel. As shown, the LCD cell includes a lower substrate 1, an upper substrate 11 and an interposed liquid crystal material 10 between the lower and upper substrates 1 and 11. A pixel electrode 3 is formed on the lower substrate 1 while a common electrode 12 is formed on the upper substrate 11. The lower substrate 1 and the upper substrate 11 is spaced apart by the distance "d" of about 5 $\mu$m (i.e., a cell gap).

In the conventional method of injecting the liquid crystal material as described above, the vacuum injection method is employed after attaching and aligning the array substrate (lower substrate) 1 and the color filter substrate (upper substrate) 11. However, it takes too much time to inject the liquid crystal material into the LCD cell larger than 20 inches. For the LCD cell less than 20 inches, it does not take much time to inject the liquid crystal material.

Further, the large LCD panel requires a short response time to improve in displaying a moving image and to decrease a residual image. To achieve the short response time, the distance "d" can be fixed by a gap of less than 4 $\mu$m. The electric field becomes stronger between the pixel electrode and the common electrode due to a shorter distance. However, the injection time becomes longer and the defect of injecting the liquid crystal may occur. Moreover, since the vacuum injection is employed in injecting the liquid crystal, it is difficult to maintain a uniform cell gap between the pair of substrates.

SUMMARY OF THE INVENTION

Accordingly, the present invention is directed to a method of fabricating a liquid crystal display panel that substantially obviates one or more of the problems due to limitations and disadvantages of the related art.

An object of the present invention is to decrease an injection time of the liquid crystal as well as to increase yield of the liquid crystal display panel.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantage and in accordance with the purpose of the present invention, as embodied and broadly described, a method of fabricating a liquid crystal display panel having first and second substrates includes the steps of forming first and second orientation films on the first and second substrates, respectively, forming a seal material at edges of the first substrate, assembling the first and second substrates with each other, performing a first pressurizing and heating process on the first and second substrates to form a first cell gap, injecting a liquid crystal material into the first cell gap, performing second pressurizing and heating process on the first and second substrates to form a second cell gap, and sealing the second cell gap.

In another aspect of the present invention, a method of fabricating a liquid crystal display panel having first and second substrates includes the steps or assembling the first substrate with the second substrate, performing a first pressurizing and heating process on the assembled substrates to have a first cell gap, injecting a liquid crystal material into the first cell gap, performing second pressurizing and heating process on the substrates to have a second cell gap, sealing the second cell gap, and cutting the sealed panel into a unit cell.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to illustrate the principles of the invention.

In the drawings:

FIGS. 5A and 5B are schematic cross-sectional views illustrating a partial manufacturing process of the liquid crystal display panel according to a preferred embodiment of the present invention; and FIG. 6 is a flow chart illustrating a manufacturing process according to the preferred embodiment of the present invention.

DETAILED DESCRIPTION OF THE PREFERRED EMBODIMENTS

Figure 1:
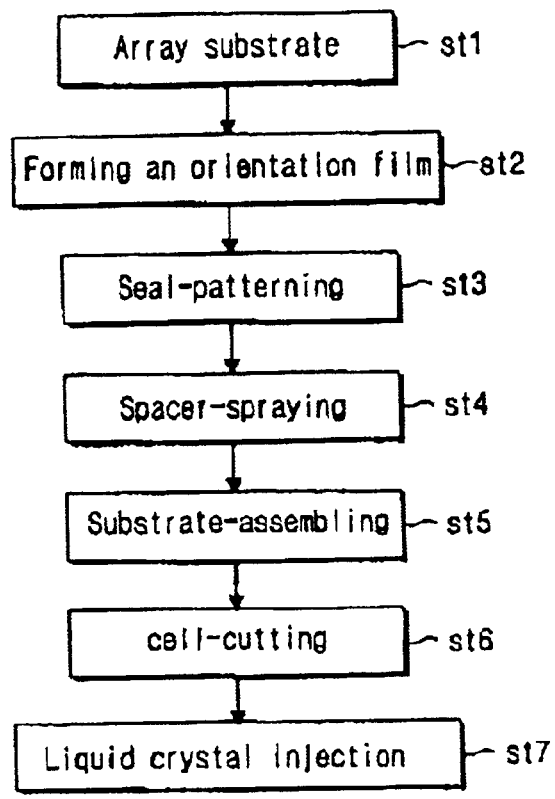
FIG. 1 is a block diagram illustrating a typical manufacturing process for a liquid crystal cell.
Figure 2:
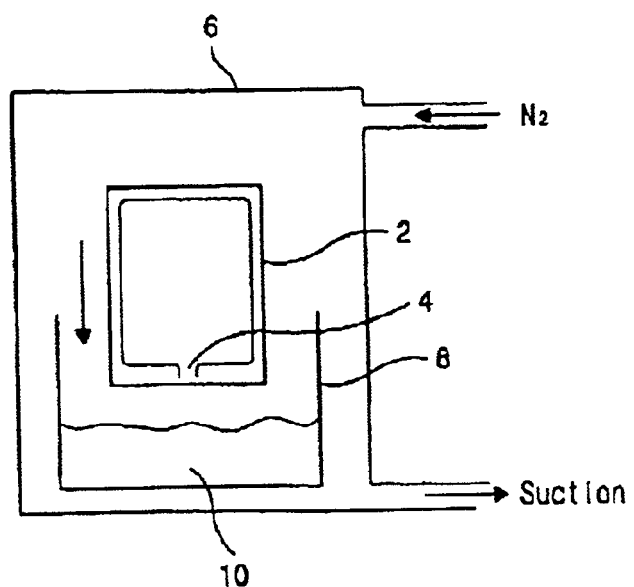
FIG. 2 illustrates a schematic view of a typical vacuum injection apparatus.
Figure 3:
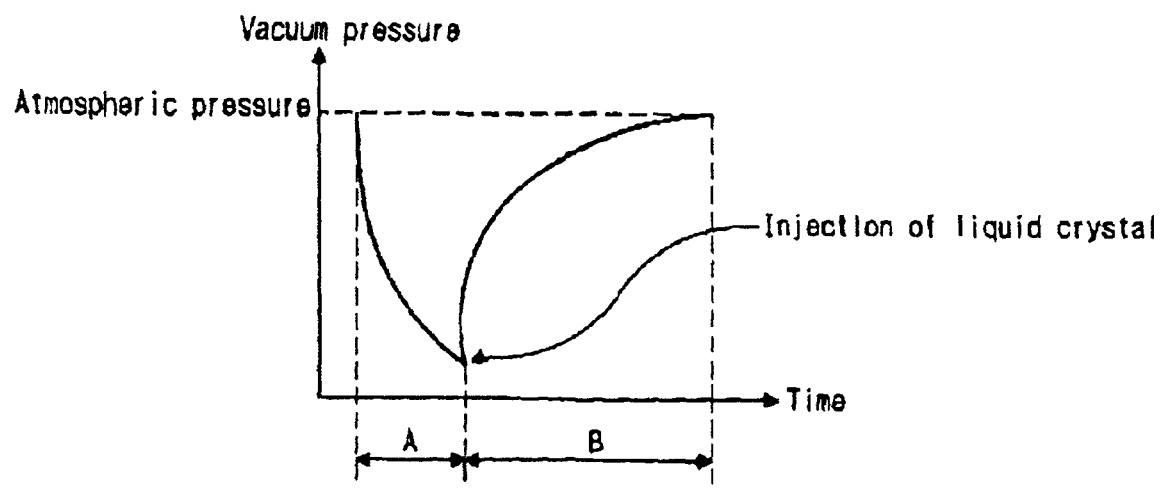
FIG. 3 is a graph of the vacuum pressure versus an injection time in injecting a liquid crystal material into the liquid crystal cell.
Figure 4:
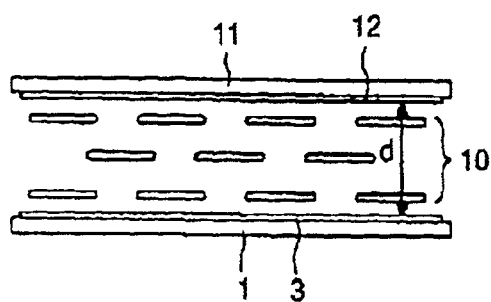
FIG. 4 is a schematic cross-sectional view of a typical liquid crystal display cell.

Reference will now be made in detail to the preferred embodiments of the present invention, examples of which are illustrated in the accompanying drawings.

FIGS. 5A and 5B illustrate processes of attaching a pair of substrates according to the preferred embodiment of the present invention. In the present invention, a thermoplastic resin is employed as a seal pattern. Unlike a thermosetting resin, the thermoplastic resin can be melted and solidified several times by applying thermal heat.

FIG. 5A illustrates an assembling process of a lower substrate 100 and an upper substrate 200. As shown in FIG. 5A, the lower substrate 100 has a seal pattern 300. The upper substrate 200 is attached to the lower substrate 100 through the seal pattern 300 by the first pressurizing and heating process. The seal pattern 300 is made of the thermoplastic resin. The first cell gap between the lower substrate 100 and the upper substrate 200 is formed to have the distance ($d_1$), for example, at least 5 μm in order to inject the liquid crystal readily. Namely, by controlling the first pressurizing and heating process of the pair of substrates, the distance ($d_1$) is formed. Thereafter, although not shown in the drawing, a liquid crystal material is injected into the assembled substrates that have the first cell gap of the distance ($d_1$).

FIG. 5B illustrates a second pressurizing and heating process of the liquid crystal cell that contains the liquid crystal material 20 therein. The second pressurizing and heating process accomplish the second cell gap of the distance ($d_2$). The second cell gap of the distance ($d_2$) is the final cell gap of the liquid crystal cell. The second cell gap is adjustable in the pressurizing and heating process, so that it can be determined by design. The second cell gap may be less than 4 μm, so that it is narrower than the first cell gap. Therefore, the distance between the lower substrate 100 and the upper substrate 200 becomes narrow, so that the applied electric field between the lower substrate 100 and the upper substrate 200 is stronger. As a result, a response time of the liquid crystal material 20 becomes shorter.

It is desirable that the force and temperature in the second pressurizing and heating process are greater than those of the first that process in order to have a difference distance between the first and second cell gaps. As described above, a response time of the liquid crystal is very important in the large LCD device. As the response time becomes shorter, a residual image decreases and a moving image can be displayed in real time.

FIG. 6 is a flow chart illustrating a fabrication process for a liquid crystal display panel after the step (st4) of FIG. 1 according to the preferred embodiment of the present invention. In the initial step (st10), a lower substrate and an upper substrate are bonded to each other. At this time, a seal pattern has been formed on the lower substrate.

In the next step (st20), the first pressurizing and heating process is performed in a well-balanced manner so that the first cell gap between the lower substrate and the upper substrate is formed to have the distance ($d_1$) (shown in FIG. 5A), for example, at least 5 μm.

Due to the distance ($d_1$) (for example, at least 5 μm) a liquid crystal material can easily be injected into the first cell gap in step st30. Thus, an injection time decreases compared to the conventional art.

In the next step (st40), the second pressurizing and heating process is performed such that the second cell gap between the lower substrate and the upper substrate is formed to have the distance ($d_2$) (shown in FIG. 5B), for example, less than 4 μm.

In the next step (st50), a sealing process is performed such that an injection hole of the second cell gap is completely sealed.

Referring to the step st51 of FIG. 6, after the step st40, an additional sealing process may be preformed. This additional sealing process prevents the infected liquid crystal material from leaking from the liquid crystal cell in the second pressurizing and heating process. After the step st50, a cell cutting process will be performed.

According to the above-mentioned method in the present invention, the second pressurizing and heating process is performed after bonding a pair of substrates and after injecting the liquid crystal material. Thus, unlike the conventional method that injects the liquid crystal material into the cell gap of less than 4 μm, an injection time is much decreased. In other word, due to a larger cell gap, for example, greater than 5 μm, the liquid crystal material is injected into the cell gap easily and rapidly. Moreover, due to the second pressurizing and heating process, the second cell gap can easily be adjusted within the designed distance.

Accordingly, the method of fabricating a liquid crystal cell according to the preferred embodiment of the present invention has the following advantages.

First, a liquid crystal material is injected into the cell gap in a shorter time compared to the conventional art.

Second, since the cell gap is adjusted to the designed thickness by performing the second pressurizing and heating, a smaller cell gap is obtained.

Third, due to the smaller cell gap in the second advantage, a response time of the liquid crystal material is shortened so that a residual image decreases. In addition, a moving image is displayed more clearly in the LCD device.

It will be apparent to those skilled in the art that various modifications and variation can be made in the present invention without departing from the spirit or scope of the invention. Thus, it is intended that the present invention covers the modifications and variations of this invention provided they come within the scope of the appended claims and their equivalents.

What is claimed is:

1. A method of fabricating a liquid crystal display panel having first and second substrates, the method comprising the steps of:

forming a first and second orientation films on the first and second substrates, respectively;

forming a seal material at edges of the first substrate;

assembling the first and second substrates with each other;

performing a first pressurizing and heating process on the first and second substrates to form a first cell gap;

injecting a liquid crystal material into the first cell gap;

performing a second pressurizing and heating process on the first and second substrates to form a second cell gap, wherein the second heating process is sufficient to soften the seal material, the second pressurizing and heating process applies a greater pressure and a higher temperature to the first and second substrates than the first pressurizing and heating process, and the second cell gap is narrower than the first cell gap; and sealing the second cell gap.

2. The method according to claim 1, further comprising the step of sealing the first cell gap before the step of performing the second pressurizing and heating process.

3. The method according to claim 1, wherein the first cell gap is at least 5 μm.

4. The method according to claim 1, wherein the second cell gap is at least 4 μm.

5. The method according to claim 1, wherein the stop of sealing is performed by using a thermoplastic resin.

6. A method of fabricating a liquid crystal display panel having first and second substrates, the method comprising the steps of:

assembling the first substrate with the second substrate;

performing a first pressurizing and heating process on the assembled substrates to have a first cell gap;

injecting a liquid crystal material into the first cell gap;

performing a second pressurizing and heating process on the substrates to have a second cell gap, wherein the second heating process is sufficient to soften the seal material, the second pressurizing and healing process applies a greater pressure and a higher temperature to the first and second substrates than the first pressurizing and heating process, and the second cell gap is narrower than the first cell gap;

sealing the second cell gap; and cutting the sealed panel into a unit cell.

7. The method according to claim 6, further comprising the step of sealing the first cell gap before the step of performing the second pressurerizing and heating process.

8. The method according claim 6, wherein the first cell gap is at least 5 $\mu$m.

9. The method according to claim 6, wherein the second cell gap is at least 4 $\mu$m.

10. The method according to claim 1, wherein the step of sealing is performed by using a thermoplastic resin.

* * * * *